| United States Patent [19] | [11] Patent Number: 4,475,939 |
|---|---|
| Michaud et al. | [45] Date of Patent: Oct. 9, 1984 |

[54] STABILIZED FERTILIZER SOLUTIONS

[75] Inventors: Horst Michaud, Trostberg; Hermann Raveling, Altenmarkt; Josef Seeholzer, Trostberg, all of Fed. Rep. of Germany

[73] Assignee: SKW Trostberg Aktiengesellschaft, Trostberg, Fed. Rep. of Germany

[21] Appl. No.: 420,772

[22] Filed: Sep. 21, 1982

[30] Foreign Application Priority Data

Dec. 3, 1981 [DE] Fed. Rep. of Germany ....... 3147821

[51] Int. Cl.$^3$ .............................................. C05C 9/00
[52] U.S. Cl. ........................................... 71/28; 71/61; 71/64.1; 71/902
[58] Field of Search .................... 71/1, 11, 27, 28, 30, 71/57, 61, 64.1, 64.13, 902; 564/104

[56] References Cited

U.S. PATENT DOCUMENTS 4,234,332  11/1980  Michaud et al. .................. 71/27 X

FOREIGN PATENT DOCUMENTS 131062   5/1978  Fed. Rep. of Germany .......... 71/27
53-69162 6/1978  Japan ..................................... 71/902

Primary Examiner—Ferris H. Lander
Attorney, Agent, or Firm—Felfe & Lynch

[57] ABSTRACT

The present invention provides a stabilized fertilizer solution, especially a nitrogen fertilizer solution, with a content of dicyandiamide as nitrification inhibitor, wherein, for retarding dicyandiamide crystallization, the solution contains at least one water-soluble organic polymeric compound as stabilizer.

11 Claims, No Drawings

STABILIZED FERTILIZER SOLUTIONS

BACKGROUND

The present invention is concerned with stabilized fertilizer solutions in which the crystallizing out of certain components is prevented by use of water soluble organic polymeric compounds as a stabilizer.

An effective nitrification inhibitor in nitrogen fertilizers is, for example, dicyandiamide, its use in liquid fertilizers being of especial interest. A high effectiveness of the nitrification inhibition is achieved when the amount of dicyandiamide nitrogen accounts for about 10% of the total amount of nitrogen in the fertilizer. In the case of nitrogen fertilizers based on ammonium nitrate-urea, this amount of dicyandiamide easily remains in solution at temperatures down to about 20° C. but, upon cooling to temperatures of 10° C. and below, within a short time, dicyandiamide crystallizes out as crystals—rapidly growing to a size of 1 mm. or more—with concurrent lose of dissolved dicyandiamide from the solutions. As fertilizer solutions are applied by spraying or sprinkling, a practical problem arises with the separation of large crystals of dicyandiamide, namely conduit pipes, sieves and nozzles are rapidly blocked. Considering that nitrogen fertilizer solutions are preferably used in the early part of the year, during which time, in northern latitudes, very low outside temperatures still prevail, the problems with crystallizing out of dicyandiamide are often encountered in practice, especially when the solutions have been stored over the winter.

Thus, it is an object of the invention to provide stable fertilizer solutions in which the crystallization of dicyandiamide is prevented over long periods of storage and/or cooling.

DESCRIPTION

The present invention provides for retarding dicyandiamide crystallization in a fertilizer solution by the addition of at least one water-soluble organic polymeric compound as stabilizer.

Polymers which possess crystallization-retarding properties for dicyandiamide include, for example, the polyaldehyde-carboxylic acids. Appropriate polymers of this type possess, in the form of a 50% aqueous solution, a viscosity of 400 mPas at 20° C. and have an average molecular weight of 1500. Polymers which are especially preferred are those of vinyl alcohol with a definite degree of viscosity and hydrolysis, such as Polyviol W or Moviol LP types with a viscosity of 5 to 50 mPas (measured on a 4% aqueous solution at 20° C.) and a degree of hydrolysis of 70 to >99 mole %. Similar properties are also possessed by natural products obtained from polymannose and galactomannanes, as well as cellulose ethers and certain modified types of starch.

These materials are available in sufficient amounts at economic prices. They are physiologically completely compatible since, inter alia, they are also used in the foodstuff industry.

For the introduction into the fertilizer solutions, it is preferable to introduce the polymers in an already dissolved form, for example in the form of a solution of known content. Such solutions can be simply produced by stirring the powdery polymer into water and then gently warming. Mixing the polymer solutions with the fertilizer solutions takes place in a simple manner by stirring together the components.

It is also to be understood that individual polymers as well as mixtures of polymers can be used according to the present invention.

The polymers effectively delay the crystallization of dicyandiamide, practically without changing the viscosity of the fertilizer solutions.

The amount of polymer to be used depends upon its chemical structure. However, in general, 0.005 to 0.5% by weight in the fertilizer solution is sufficient, an amount of from 0.02 to 0.3% by weight being preferred. This content of polymer effectively prevents a crystallizing out of the dicyandiamide from the fertilizer solutions, even when the solution is supersaturated with dicyandiamide due to a lowering of the temperature. In this manner, it is possible to keep constant the dicyandiamide content in the solution and to avoid difficulties in the application of the solutions.

The following Examples are given for the purpose of illustrating the present invention:

EXAMPLE 1

Into a fertilizer solution consisting of 39.5% by weight of ammonium nitrate, 30.5% by weight of urea, 4.3% by weight of dicyandiamide (corresponding to 10% by weight of dicyandiamide nitrogen, based on the total nitrogen content of the solution) and 25.7% by weight of water there were stirred at 20° C. the polymer solutions set out in the following Table 1. The solutions were cooled to 6° C. and stored at this temperature. The number of days of storage were recorded after which the first crystallization of dicyandiamide was observed. The results obtained are given in the following Table 1.

TABLE 1

| crystallization-inhibiting agent | added amount of anhydrous polymer (wt. %) | commencement of crystallization (after days) at 6° C. |
|---|---|---|
| without | 0 | 2 |
| polyaldehyde carboxylic acid, 50% solution (POC HS 2020, Degussa) | 0.1 | 26 |
| polyvinyl alcohol, 20% (Polyviol W 25/190, Wacker) | 0.1 | >90 |
|  | 0.02 | >90 |
| polyvinyl alcohol, 20% (Polyviol W 48/20, Wacker) | 0.1 | 12 |
|  | 0.02 | 11 |

EXAMPLE 2

In a nitrogen fertilizer solution consisting of 39.5% by weight of ammonium nitrate, 30.5% by weight of urea and 30.0% by weight of water there was dissolved at 20° C. such an amount of dicyandiamide that the dicyandiamide nitrogen content amounted to 10% by weight of the total nitrogen content of the fertilizer solution (4.2 parts by weight of dicyandiamide per 100 parts by weight of fertilizer solution). After the addition of the polymer solutions set out in the following Table 2, the solutions were cooled to 0° C. The period of time up to the observation of the first formation of dicyandiamide crystals was observed. The results obtained are given in the following Table 2:

TABLE 2

| crystallization-inhibiting agent | added amount of anhydrous polymer (wt. %) | commencement of crystallization (after days) at 0° C. |
|---|---|---|
| without | 0 | 1 |
| polyaldehyde carboxylic acid 50% (same type as in Example 1) | 0.2 | 61 |
| polyvinyl alcohol, 30% (Moviol 3-83, Hoechst) | 0.1 | 18 |
| polyvinyl alcohol, 20% (Moviol 40-88, Hoechst) | 0.1 | 15 |
| polyvinyl alcohol, 30% (Moviol LP 10-74, Hoechst) | 0.1 | 28 |
| polyvinyl alcohol, 30% (Moviol LP 15-79, Hoechst) | 0.07 | 28 |

EXAMPLE 3

In a nitrogen fertilizer solution analogous to that used in Example 2 there was dissolved at 20° C. so much dicyandiamide that the dicyandiamide nitrogen content amounted to 9% by weight of the total nitrogen content of the fertilizer solution (3.78 parts by weight of dicyandiamide per 100 parts by weight of fertilizer solution). After mixing with the polymer solutions set out in the following Table 3, the fertilizer solutions were cooled to 0° C. The period of time up to the observation of the first formation of crystals of dicyandiamide was observed. The results obtained are set out in the following Table 3:

TABLE 3

| crystallization-inhibiting agent | added amount of anhydrous polymer (wt. %) | commencement of crystallization (after days) at 0° C. |
|---|---|---|
| without | 0 | 2 |
| polyaldehyde carboxylic acid, 50% (same type as in Example 1) | 0.1 | >90 (still no crystallization) |
| polymannose, 20% (Diagum A8, Diamalt) | 0.1 | 21 |
| polymannose, 20% (Diagnar GH, Diamalt) | 0.1 | 19 |
| polyvinyl alcohol, 30% (Moviol LP 10-74) | 0.01 | >90 (still no crystallization) |
| polyvinyl alcohol, 30% (Moviol LP 15-79) | 0.1 | >90 (still no crystallization) |

It will be understood that the specification and examples are illustrative but not limitative of the present invention and that other embodiments within the spirit and scope of the invention will suggest themselves to those skilled in the art.

What is claimed is:

1. In a fertilizer solution including dicyandiamide as a nitrification inhibitor, the improvement, for retarding dicyandiamide crystallization, wherein the solution contains an effective amount of at least one water-soluble organic polymeric compound as a stabilizer for the dicyandiamide.

2. The fertilizer solution of claim 1, wherein the polymeric compound has been added to the fertilizer solution in the form of an aqueous solution.

3. The fertilizer solution of claim 1, wherein the polymeric compound is polyvinyl alcohol.

4. The fertilizer solution of claim 1, wherein the polymeric compound is a polyaldehyde carboxylic acid.

5. The fertilizer solution of claim 1, 3 or 4 wherein the content of polymeric compound is from 0.005 to 0.5% by weight.

6. The fertilizer solution of claim 5, wherein the content of polymeric compound is from 0.02 to 0.3% by weight.

7. The fertilizer solution of claim 1 based on ammonium nitrate and urea.

8. The fertilizer solution of claim 1, wherein said polymeric compound comprises 0.005 to 0.5% by weight of the fertilizer solution of polyaldehyde-carboxylic acids having an average molecular weight of 1500 and, in a 50% aqueous solution at 20° C., a viscosity of 400 m pas.

9. The fertilizer solution of claim 1 wherein said polymeric compound comprises 0.005 to 0.5% by weight of the fertilizer solution of vinyl alcohol having a viscosity of 5 to 50 m pas measured on a 4% aqueous solution at 20° C. and having a degree of hydrolysis of 70 to 90 mole%.

10. The fertilizer solution of claim 1 wherein said polymeric compound comprises 0.005 to 0.5% by weight of the fertilizer solution of polymannose, galactomannones, cellulose ethers, or modified starch having a viscosity of 5 to 50 m pas of hydrolysis of 70 to 90 mole%.

11. The fertilizer solution of claim 1 comprising ammonium nitrate, urea and dicyandiamide, wherein the dicyandiamide nitrogen content comprises about 10% by weight of the total nitrogen content, and 0.005 to 0.5% of a polyaldehyde carboxylic acid or polyvinyl alcohol as a stabilizer for the dicyandiamide.

* * * * *